US010389108B2

(12) United States Patent
Duvnjak

(10) Patent No.: US 10,389,108 B2
(45) Date of Patent: Aug. 20, 2019

(54) OVERCURRENT PROTECTION IN A POWER CONVERTER

(71) Applicant: Power Integrations Inc., San Jose, CA (US)

(72) Inventor: Rajko Duvnjak, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/816,593

(22) Filed: Nov. 17, 2017

(65) Prior Publication Data

US 2019/0157860 A1 May 23, 2019

(51) Int. Cl.
*H02H 7/12* (2006.01)
*H02M 1/08* (2006.01)
*H02M 3/335* (2006.01)

(52) U.S. Cl.
CPC ............ *H02H 7/1213* (2013.01); *H02M 1/08* (2013.01); *H02M 3/33569* (2013.01)

(58) Field of Classification Search
CPC ... H02H 7/1213; H02M 1/08; H02M 3/33569
See application file for complete search history.

(56) References Cited

U.S. PATENT DOCUMENTS 9,520,795 B2 * 12/2016 Stuler ............... H02M 3/33523
2015/0326103 A1 * 11/2015 Choi .................... H02M 1/088 363/21.02
2016/0254755 A1 * 9/2016 Deboy ............. H02M 3/33546 363/21.02
2017/0054378 A1 * 2/2017 Njiende T. .......... H01F 27/2823

* cited by examiner

*Primary Examiner* — Jue Zhang
*Assistant Examiner* — Kevin H Sprenger
(74) *Attorney, Agent, or Firm* — Andrew J. Borja

(57) ABSTRACT

An LLC resonant converter controller comprising an overcurrent protection circuit coupled to receive a current sense signal representative of current in a primary winding, wherein the overcurrent protection circuit outputs an overcurrent signal when the perturbed current sense signal is above a low threshold for a number of consecutive switching cycles. The LLC resonant converter controller further includes a control circuit coupled to generate a high side drive signal and a low side drive signal in response to a feedback signal representative of an output of an LLC resonant converter is further coupled to receive the overcurrent signal and is operable to disable switching of the first power switch and second power switch in response to the overcurrent signal.

13 Claims, 8 Drawing Sheets

OVERCURRENT PROTECTION IN A POWER CONVERTER

BACKGROUND INFORMATION

Field of the Disclosure

The present invention relates generally to resonant power converters, and more specifically for detecting an overcurrent condition based on the primary side current.

Background

Switch mode power supplies are used in a variety of household or industrial appliances that require a regulated direct current (dc) voltage for their operation. A controller for switch mode power supplies for controlling the power switch for the transfer of energy can use PWM (pulse width modulation) or PFM (pulse frequency modulation) to regulate the output voltage.

One type of power supply topology is a resonant switch mode power supply. Resonant switched mode power supplies with PFM control have some advantages, which include having sinusoidal waveforms and intrinsic soft switching compared to non-resonant converters. Resonant switch mode power supplies can also operate at higher frequencies with low switching loss, utilize smaller magnetic elements, which therefore require smaller packaging, and still operate with high efficiency. Since resonant switch mode power supplies generally do not have waveforms with sharp edges (e.g. waveforms having high di/dt or dv/dt). EMI performance is improved, which therefore enables the use of smaller EMI filters. The output of a resonant switch mode power supply is often achieved by sensing the output and controlling the power supply in a closed loop by varying the switching frequency.

LLC converters are a type of resonant switched mode power supply, which utilizes the resonance between two inductors and a capacitor. LLC converters are popular due to the savings on cost and size which can be realized by utilizing the magnetizing and leakage inductance of the transformer as at least a part of the resonance component of the LLC converter. In addition, LLC converters can achieve stability when they are operated at above resonance with zero voltage switching, which results in less switching loss and increased efficiency. Furthermore, LLC converters can achieve output regulation in a narrow band of frequency control because of their negative and high slope gain characteristic when operating above resonance.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
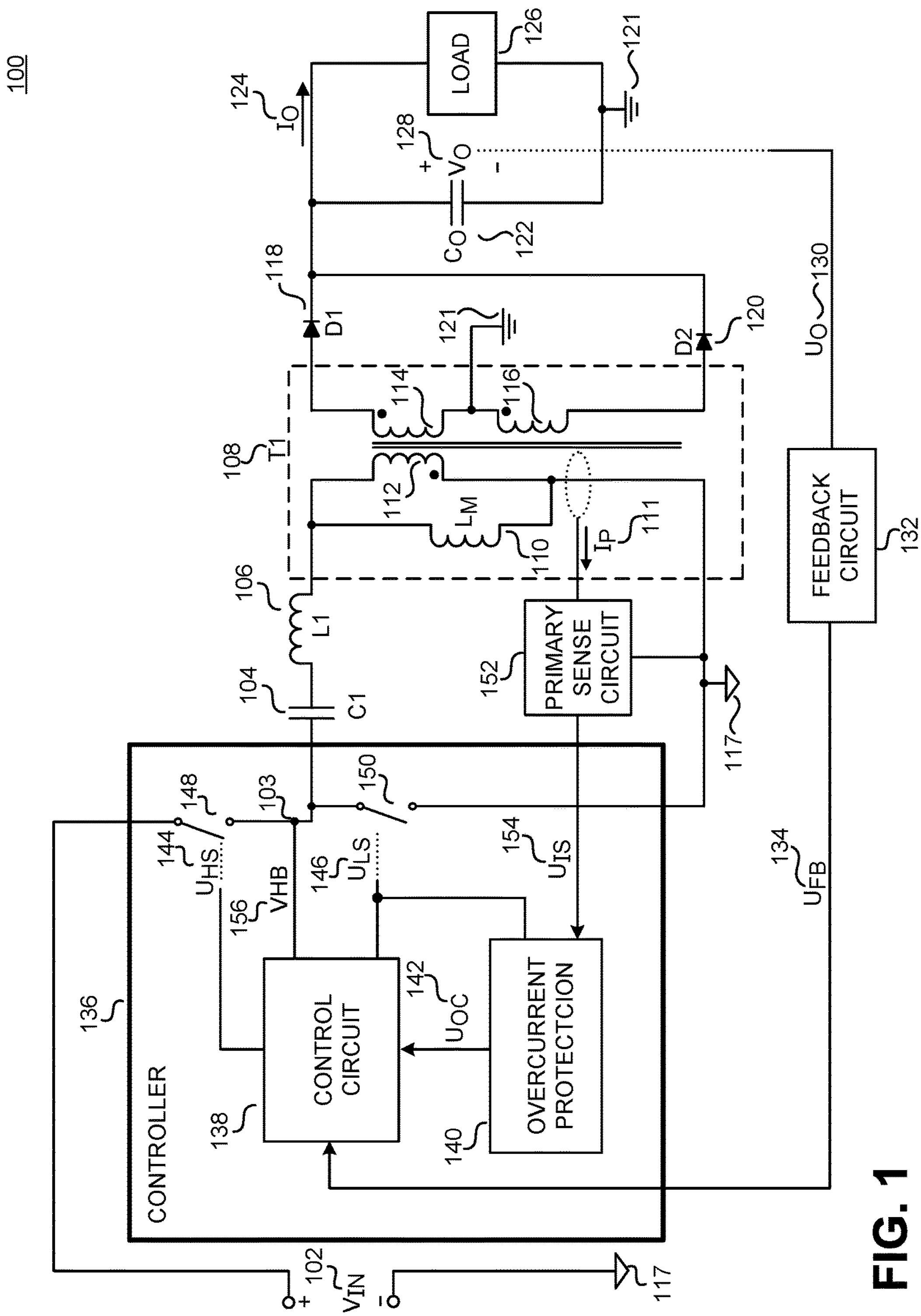
FIG. 1 is a block diagram illustrating one example of a half bridge LLC power converter that includes a controller in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Circuitry is described that improves an overcurrent protection when the resonant converter is operating at lower input voltage such that an overload condition would generally not be detected. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

FIG. 1 is a block diagram illustrating one example of a half bridge LLC power converter that includes a controller in accordance with the teachings of the present disclosure.

FIG. 1 shows a functional block diagram of an example power converter 100 including an input voltage $V_{IN}$ 102, a first capacitor C1 104, a first inductor L1 106, an energy transfer element T1 108, an input return 117, a first rectifier D1 118, a second rectifier D2 120, an output return 121, an output capacitor $C_O$ 122, a load 126, a feedback circuit 132, a controller 136 and a primary sense circuit 152. The controller 136 further includes a first power switch 148, a second power switch 150, a control circuit 138 and an overcurrent protection circuit 140. The first power switch 148 may be referred to as a high side switch, and the second power switch 150 may be referred to as a low side switch.

Energy transfer element T1 108 further includes a magnetizing inductance $L_M$ 112, a primary winding 112, a first secondary winding 114, and a second secondary winding 116. The primary winding 112 may be referred to as an input winding, and the secondary winding 114 may be referred to as an output winding In some examples, the inductance of inductor L1 106 may be an embedded property of the energy transfer element T1 108 such that the inductor L1 106 is not discrete physical component.

The example switched mode power converter 100 illustrated in FIG. 1 is coupled in a half bridge LLC configuration, which is just one example of a switched mode power converter that may benefit from the teachings of the present invention. It is appreciated that other known topologies and configurations of switched mode power converters may also benefit from the teachings of the present invention.

The power converter 100 provides output power to the load 126 from an input voltage $V_{IN}$ 102. In one example, the input voltage $V_{IN}$ 102 is a rectified input voltage from an ac voltage source. The first power switch 148 is coupled to receive the input voltage $V_{IN}$ 102 from a first end of the first power switch 148. The second end of first power switch 148 is coupled to a first end of the second power switch 150 by half bridge node 103. The second end of second power switch 150 is further coupled to the input return 117. The first capacitor C1 104 is coupled to a first inductor L1 106 and may function together as a tank circuit coupled to the first power switch 148 and second power switch 150 at the half bridge node 103. Energy transfer element T1 108 is coupled to the tank circuit such that energy is transferred from the primary winding 112 to the output windings 114 and 116 in response to the switching of the first power switch 148 and second power switch 150. First output winding 114 is coupled to a first rectifier D1 118. In one example, the first rectifier D1 118 is a diode. However, in some examples, the first rectifier D1 118 may be a transistor used as a synchronous rectifier. Energy is transferred and rectified by first rectifier D1 118 when the first power switch 148 is turned ON and the second power switch 150 is OFF.

The second output winding 116 is coupled to second rectifier D2 120. In one example, the second rectifier D2 120 is a diode. However, in some examples, the second rectifier D2 120 may be a transistor used as a synchronous rectifier. Energy is transferred and rectified by rectifier D2 120 when the first power switch 148 is turned OFF and the second power switch 150 is ON.

The output capacitor $C_O$ 122 and load 126 are coupled to the first rectifier D1 118 and second rectifier D2 120. An output is provided to the load 126 and may be provided as either an output voltage $V_O$ 128, and output current $I_O$ 124, or a combination of the two. For a resonant converter, the output voltage is controlled by adjusting the switching frequency and not the duty cycle. The duty cycle of a LLC half bridge is ideally fifty percent for the second power switch and first power switch.

The power converter 100 further includes circuitry to regulate the output, which is exemplified as output quantity $U_O$ 130. In general, the output quantity $U_O$ 130 is either an output voltage $V_O$ 128, an output current $I_O$ 124, or a combination of the two. A feedback circuit 132 is coupled to sense the output quantity $U_O$ 130 and to provide a feedback signal $U_{FB}$ 134, which is representative of the output quantity $U_O$ 130. Feedback signal $U_{FB}$ 134 may be a voltage signal or a current signal.

In one example, there may be a galvanic isolation (not shown) between the controller 136 and the feedback circuit 132. The galvanic isolation could be implemented by using devices such as an opto-coupler, a capacitor or a magnetic coupling. In a further example, the feedback circuit 132 may utilize a voltage divider to sense the output quantity $U_O$ 130 from the output of the power converter 100.

The control circuit 138 of controller 136 is coupled to receive the feedback signal $U_{FB}$ 134 from the feedback circuit 132. An input of the control circuit 138 is coupled to receive a half bridge voltage $V_{HB}$ 156. Furthermore, the control circuit 138 is operable to provide a high side drive signal $U_{HS}$ 144 to the first power switch 148 and a low side drive signal $U_{LS}$ 146 to the second power switch 150. The primary sense circuit 152 is coupled to sense the primary current $I_P$ 111 and outputs a current sense signal $U_{IS}$ 154. The overcurrent protection circuit 140 is coupled to receive the low side drive signal $U_{LS}$ 146 and the current sense signal $U_{Is}$ 154. In one example, the overcurrent protection circuit 140 includes circuitry that perturbs the current sense signal $U_{IS}$ 154 in order to produce a perturbed current sense signal coupled to output an overcurrent signal $U_{OC}$ 142 when the perturbed current sense signal is above a low threshold for a number of consecutive switching cycles.

The control circuit 138 is operable to disable switching of the first power switch 148 and second power switch 150 in response to receiving the overcurrent signal $U_{OC}$ 142. An assertion of the overcurrent signal $U_{OC}$ 142 indicates an overcurrent condition has been detected for a number of consecutive switching cycles that would lead to an overload condition on the output. Further details on the implementation of the overcurrent protection circuit are given in FIG. 2.

Figure 2:
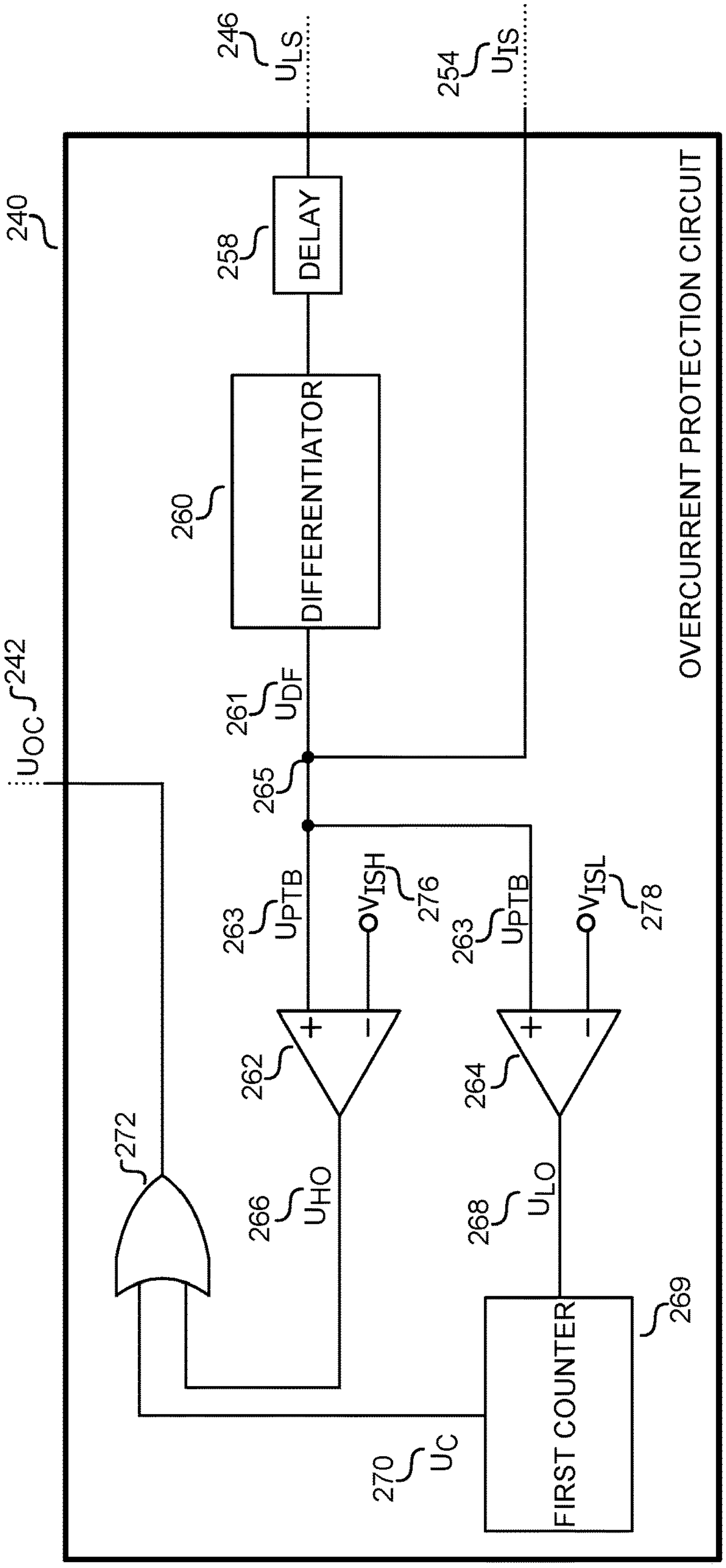
FIG. 2 is a block diagram illustrating one example of an overcurrent protection circuit in accordance with the teachings of the present disclosure.

FIG. 2 is a block diagram illustrating one example of an overcurrent protection circuit in accordance with the teachings of the present disclosure. The overcurrent protection circuit 240 is coupled to receive the low side drive signal $U_{LS}$ 246 and the current sense signal $U_{IS}$ 254 and output an overcurrent signal $U_{OC}$ 242. The overcurrent protection circuit 240 includes a delay circuit 258, a differentiator circuit 260, a first comparator 262, a second comparator 264, a first counter circuit 269, and a logic gate 272. The delay circuit 258 is coupled to receive the low side drive signal $U_{LS}$ 246 and output a delayed low side drive signal. The differentiator circuit 260 is coupled to receive the delayed low side drive signal and output a differentiator signal $U_{DF}$ 261. The differentiator signal $U_{DF}$ 261 and the current sense signal $U_{IS}$ 256 are coupled to form a perturbed current sense signal $U_{PTB}$ 263 at node 265.

The first comparator 262 is coupled to receive the perturbed current sense signal $U_{PTB}$ 263 at the non-inverting terminal, and a high threshold reference $V_{ISH}$ 276 at the inverting terminal. The high overload signal $U_{HO}$ 266 transitions to a logic high when the perturbed current sense signal is greater than the high threshold reference $V_{ISH}$ 276. The second comparator 264 is coupled to receive the perturbed sense signal $U_{PTB}$ 263 at the non-inverting terminal, and a low threshold reference $V_{ISL}$ 278 at the inverting terminal. The low overload signal $U_{LO}$ 268 transitions to a logic in response to the perturbed current sense signal $U_{PTB}$ 263 exceeding the low threshold reference $V_{ISL}$ 278.

The first counter circuit 269 increments a count in response to receiving the low overload signal $U_{LO}$ 268. In another example, the first counter can be substituted with an analog circuit that performs substantially the same function. In one example, if the low overload signal is $U_{LO}$ 268 is asserted for a number of consecutive cycles, the first counter circuit asserts a logic high of the count signal $U_C$ 270. Logic gate 272 is coupled to receive the count signal $U_C$ 270 and the high overload signal $U_{HO}$ 266 and output an overcurrent signal $U_{OC}$ 242. In one example, logic gate 272 is an OR gate.

In operation, if the perturbed current sense signal is above a high threshold, the overcurrent signal $U_{OC}$ 242 will be asserted. However, when the power converter operates at a lower input voltage, the primary current may not rise enough to trigger above the high threshold although power converter may still be in an overcurrent condition. By perturbing the current sense signal, the overcurrent protection circuit 240 can detect an overcurrent condition with lower input voltages or at a lower switching frequency.

Figure 3:
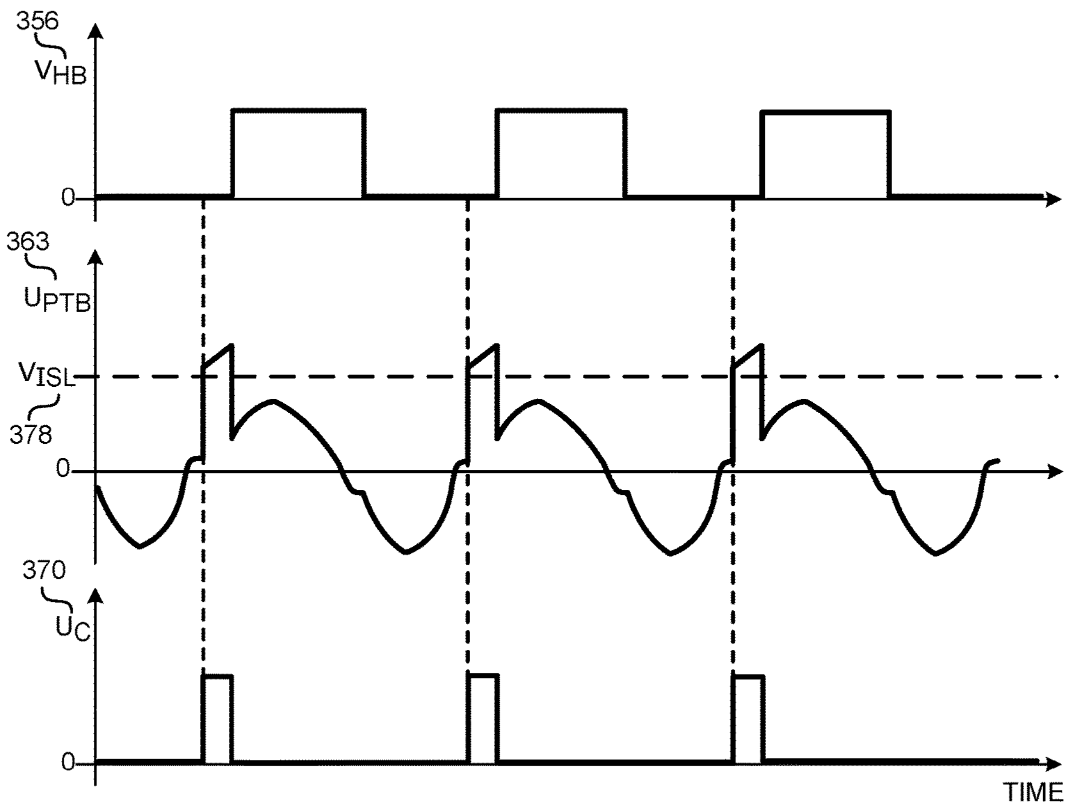
FIG. 3 is a timing diagram illustrating one example of a half bridge voltage signal, a perturbed current sense signal, and a count signal in accordance with the teachings of the present disclosure.

FIG. 3 is a timing diagram illustrating one example of a half bridge voltage signal, a perturbed current sense signal, and a count signal in accordance with the teachings of the present disclosure. The waveforms illustrate various signals of a power converter that is overloaded and operates below resonant frequency with a reduced input voltage $V_{IN}$ 102. The first timing diagram illustrates a half bridge voltage $V_{HB}$ 356. The second timing diagram illustrates a perturbed current sense signal $U_{PTB}$ 363 and a low threshold reference $V_{ISL}$ 378. The third timing diagram illustrates the count signal $U_C$ 370.

In operation, for a power converter is overloaded and operates below resonant frequency with a reduced input voltage $V_{IN}$ 102, the perturbed current sense signal rises above the low threshold reference when the half bridge voltage is at zero. When the half bridge voltage $V_{HB}$ is zero, the low side switch 150 is turned ON. Towards the end of the conduction interval of the low side switch 150, the primary current $I_P$ 111 may become positive when the power converter is overloaded. If the perturbed current sense signal $U_{PTB}$ 363 is greater than the low threshold reference $V_{ISL}$ 378, the count signal $U_C$ 370 transitions to a logic high.

Figure 4:
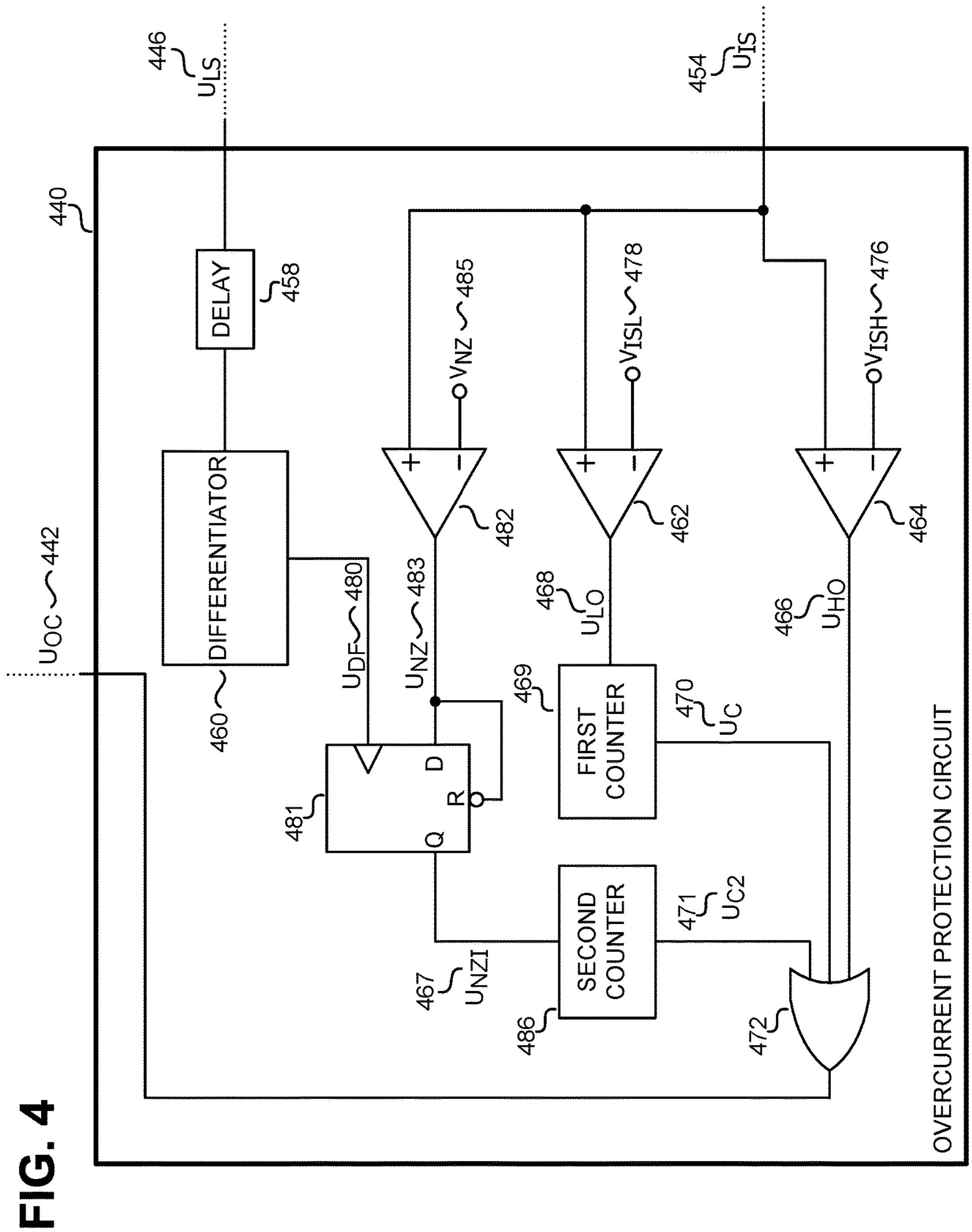
FIG. 4 is a block diagram illustrating another example of an overcurrent protection circuit in accordance with the teachings of the present disclosure.

FIG. 4 is a block diagram illustrating another example of an overcurrent protection circuit in accordance with the teachings of the present disclosure. The overcurrent protection circuit 440 is coupled to receive the low side drive signal 446 and the current sense signal $U_{IS}$ 454 and outputs an overcurrent signal $U_{OC}$ 442. The overcurrent protection circuit 440 includes a delay circuit 458, a differentiator circuit 460, a first comparator 464, a second comparator 462, a third comparator 482, a flip flop 481, a first counter 469, a second counter 486, and a logic gate 472.

The delay circuit 458 is coupled to receive the low side drive signal $U_{LS}$ 446 and outputs a delayed low side drive signal. The differentiator circuit 460 is coupled to output a differentiator signal $U_{DF}$ 480 in response to receiving the delayed low side drive signal. Flip flop 481 is coupled to receive the differentiator signal $U_{DF}$ 480 at the clock terminal.

The first comparator 462 is coupled to receive the current sense signal $U_{IS}$ 454 at the non-inverting terminal, and a low threshold reference $V_{ISL}$ 478 at the inverting terminal and outputs a low overload signal $U_{LO}$ 468. The second comparator 464 is coupled to receive the current sense signal at the non-inverting terminal, and a high threshold reference $V_{ISH}$ 478 at the inverting terminal and outputs a high overload signal $U_{HO}$ 466. The third comparator 482 is coupled to receive the current sense signal $U_{IS}$ 454 at the non-inverting terminal, and a near zero threshold reference $V_{NZ}$ 485 at the inverting terminal and outputs a near zero signal $U_{NZ}$ 483. In one example, the near zero threshold reference can be at a voltage that is zero or close to zero.

In operation, if the current sense signal is above a high threshold, the overcurrent signal $U_{OC}$ 442 can be asserted due to the high overload signal $U_{HO}$ 466 transitioning to a logic high. The low overload signal $U_{LO}$ 468 may transition to logic high when the current sense signal is greater than the low threshold reference $V_{ISL}$ 476. The first counter 469 increments the count in response to the low overload signal $U_{LO}$ 468. When the first counter exceeds a value, the count signal $U_C$ 470 transitions to a logic high. The near zero signal $U_{NZ}$ 483 may transition to a logic high when the current sense signal $U_{IS}$ 454 is greater than the near zero threshold reference $V_{NZ}$ 485. Flip flop 481 is coupled to receive the near zero signal $U_{NZ}$ 483 at the D and inverted reset R inputs and outputs a near zero indicator signal $U_{NZI}$ 467. The second counter 486 increments the count in response to the low near zero indicator signal $U_{NZI}$ 468. When the second counter 486 exceeds a value, the second count signal $U_{C2}$ 471 transitions to a logic high. In one example, the count of the first and second counter are the same value. In another example, the count of the first and second counter can differ from each other.

Logic gate 472 is coupled to receive the high overload signal $U_{HO}$ 466, the count signal $U_C$ 470, and the second count signal $U_{C2}$ 471 and outputs an overcurrent signal $U_{OC}$ 474. In one example, logic gate 472 is an OR gate. Overcurrent signal $U_{OC}$ 474 transitions to a logic high when either of the high overload signal $U_{HO}$ 466, the count signal $U_C$ 470, and the second count signal $U_{C2}$ 471 are logic high.

Figure 5:
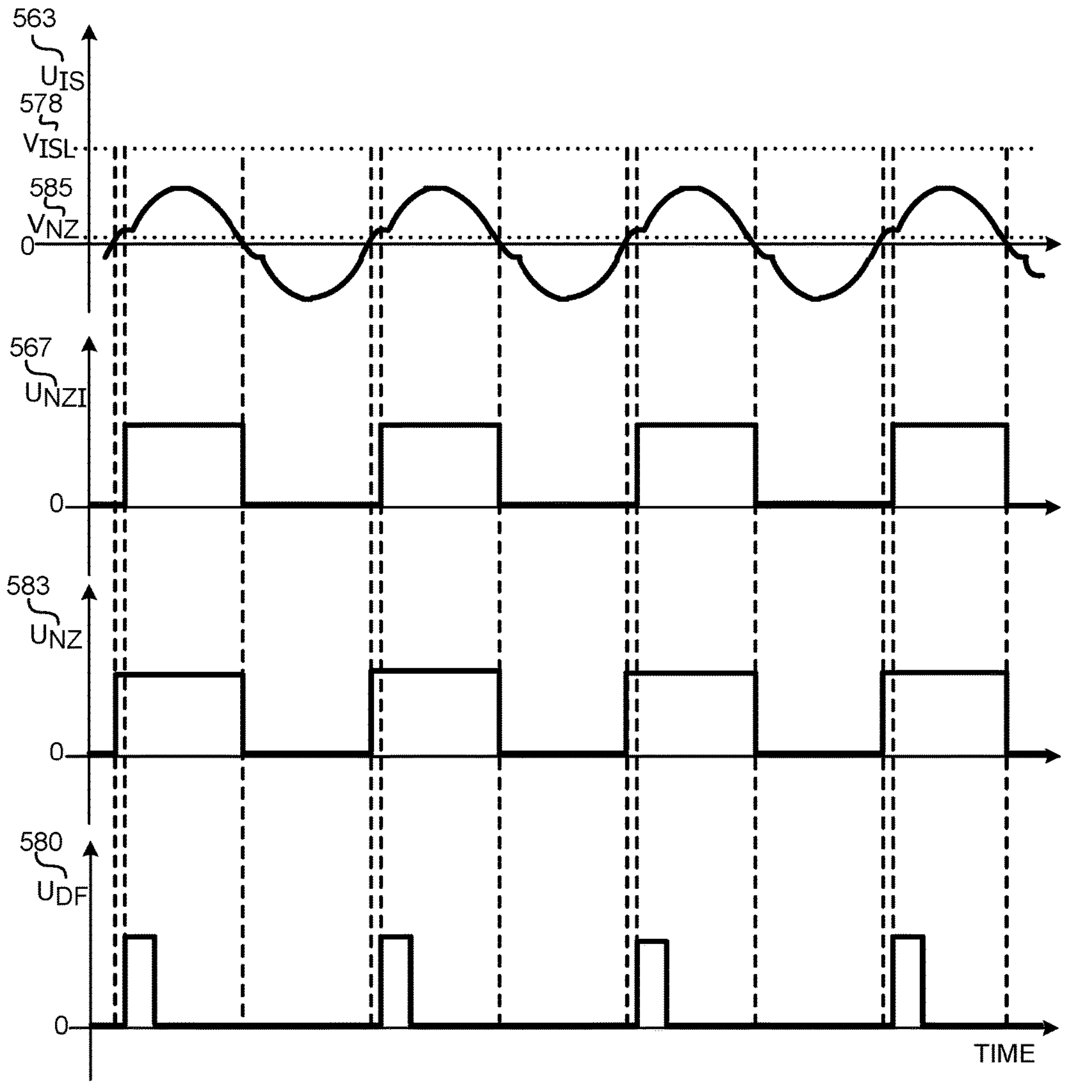
FIG. 5 is a timing diagram illustrating one example of a current sense signal, a, a near zero indicator signal, a near zero signal, and a differentiator signal in accordance with the teachings of the present disclosure.

FIG. 5 is a timing diagram illustrating one example of a current sense signal, a differentiator signal, a near zero signal and a near zero indicator signal in accordance with the teachings of the present disclosure. The first timing diagram illustrates the current sense signal $U_{IS}$ 563, and a low threshold reference $V_{ISL}$ 578, which is represented by the top horizontal dashed line and second threshold reference $V_{NZ}$ 585, which is represented by the second bottom horizontal dashed line. The second timing diagram illustrates a near zero indicator signal $U_{NZI}$ 567. The third timing diagram illustrates the near zero signal $U_{NZ}$ 583. The fourth timing diagram illustrates the differentiator signal $U_{DF}$ 580.

The overcurrent protection of FIG. 4, can determine when the power converter is overloaded and operates below resonant frequency with a reduced input voltage. The waveforms in FIG. 5 will be explained concurrently with the overcurrent protection of FIG. 4.

The current sense signal $U_{IS}$ 563 may reach a value above threshold reference $V_{NZ}$ 585, but may not reach above the low threshold reference $V_{ISL}$ 578. The differentiator signal $U_{DF}$ 580 is a signal illustrated by the pulsed waveform, which is a clock signal input to the flip flop 481. The near zero signal $U_{NZ}$ 583 is a signal illustrated by the square waveform, which is an input to the D and inverted reset R signal input of flip flop 481. The near zero signal $U_{NZ}$ is propagated through when the differentiator signal $U_{DF}$ is asserted. Flip flop 481 outputs a near zero indicator signal $U_{NZI}$ and increments the second counter.

Figure 6:
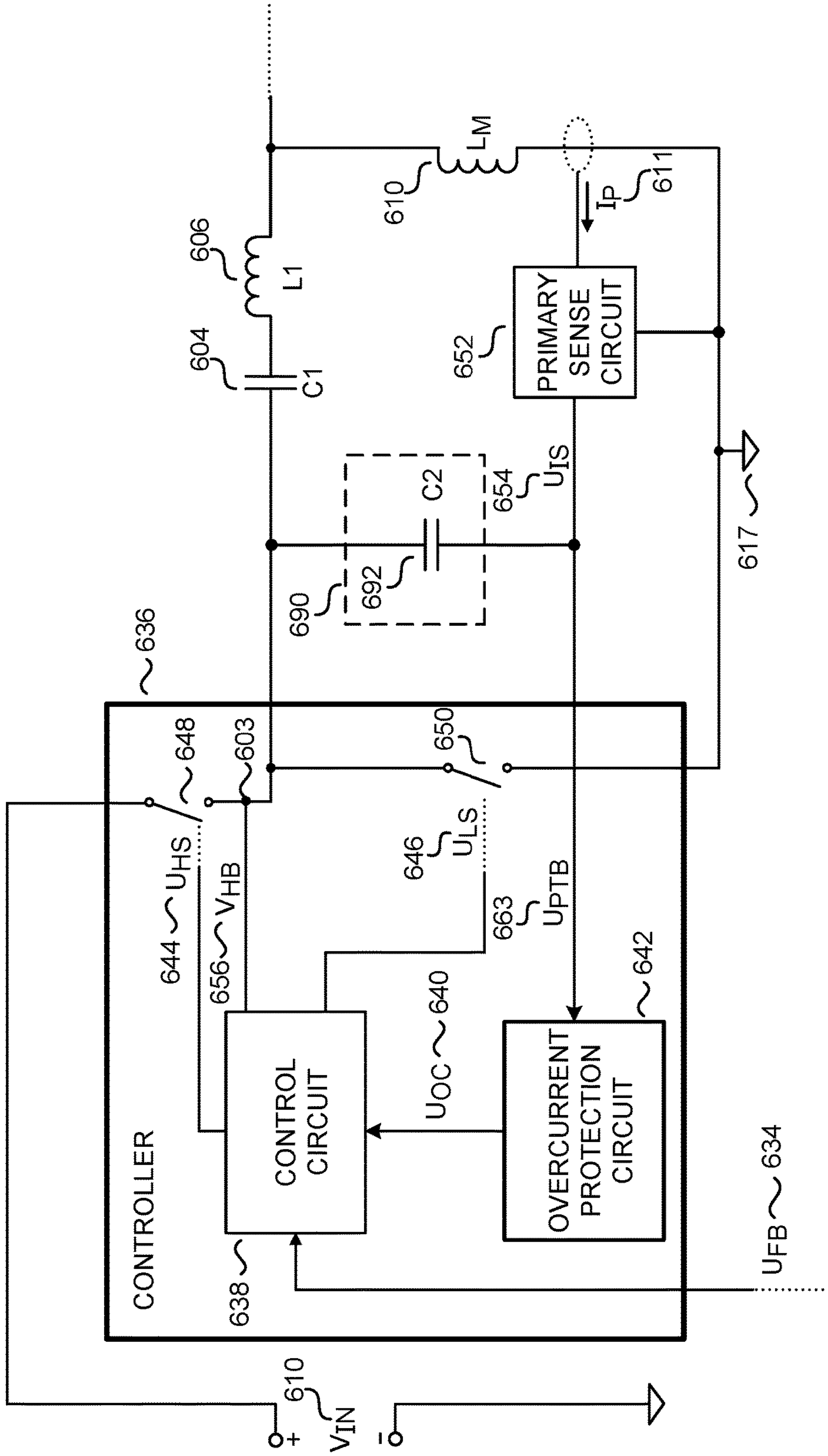
FIG. 6 is a block diagram illustrating one example of a half bridge LLC power converter that includes a controller and an external differentiator circuit in accordance with the teachings of the present disclosure.

FIG. 6 is a block diagram illustrating one example of a partial primary side partial half bridge LLC power converter that includes a controller and an external differentiator circuit in accordance with the teachings of the present disclosure. It is assumed the full power converter would include secondary side circuitry as mentioned previously in FIG. 1. Power converter 600 includes an input voltage $V_{IN}$ 610, a capacitor C1 604, an inductor L1 606, a magnetizing inductance $L_M$ 610, a primary sense circuit 652, an external differentiator circuit 690.

The first capacitor C1 604 is coupled to a first inductor L1 606 and may function together as a tank circuit coupled to the first power switch 648 and second power switch 650 at the half bridge node 603.

The primary sense circuit 652 is coupled to sense the primary current $I_P$ 611 and outputs a current sense signal $U_{IS}$ 654. The external differentiator circuit 690 is coupled to the output of the primary sense circuit 652 to generate a perturbed current sense signal $U_{PTB}$ 663. In one example, the external differentiator circuit is a capacitor C2 692.

The controller 636 includes a control circuit 638 and an overcurrent protection circuit 642. The control circuit 638 is coupled to generate a high side drive signal $U_{HS}$ 644 and a low side drive signal $U_{LS}$ 646 in response to a feedback signal $U_{FB}$ 634 for controlling the switching of a first power switch 648 and a second power switch 650. Additionally, control circuit 638 is coupled to receive the half bridge voltage $V_{HB}$ 656. The overcurrent protection circuit 663 is coupled to generate an overcurrent signal $U_{OC}$ 640 in response to the perturbed current sense signal $U_{PTB}$ 663. The control circuit 638 is coupled to receive the overcurrent signal $U_{OC}$ 640 and is operable to disable switching of a power switch in response to the perturbed overcurrent signal.

Figure 7A:
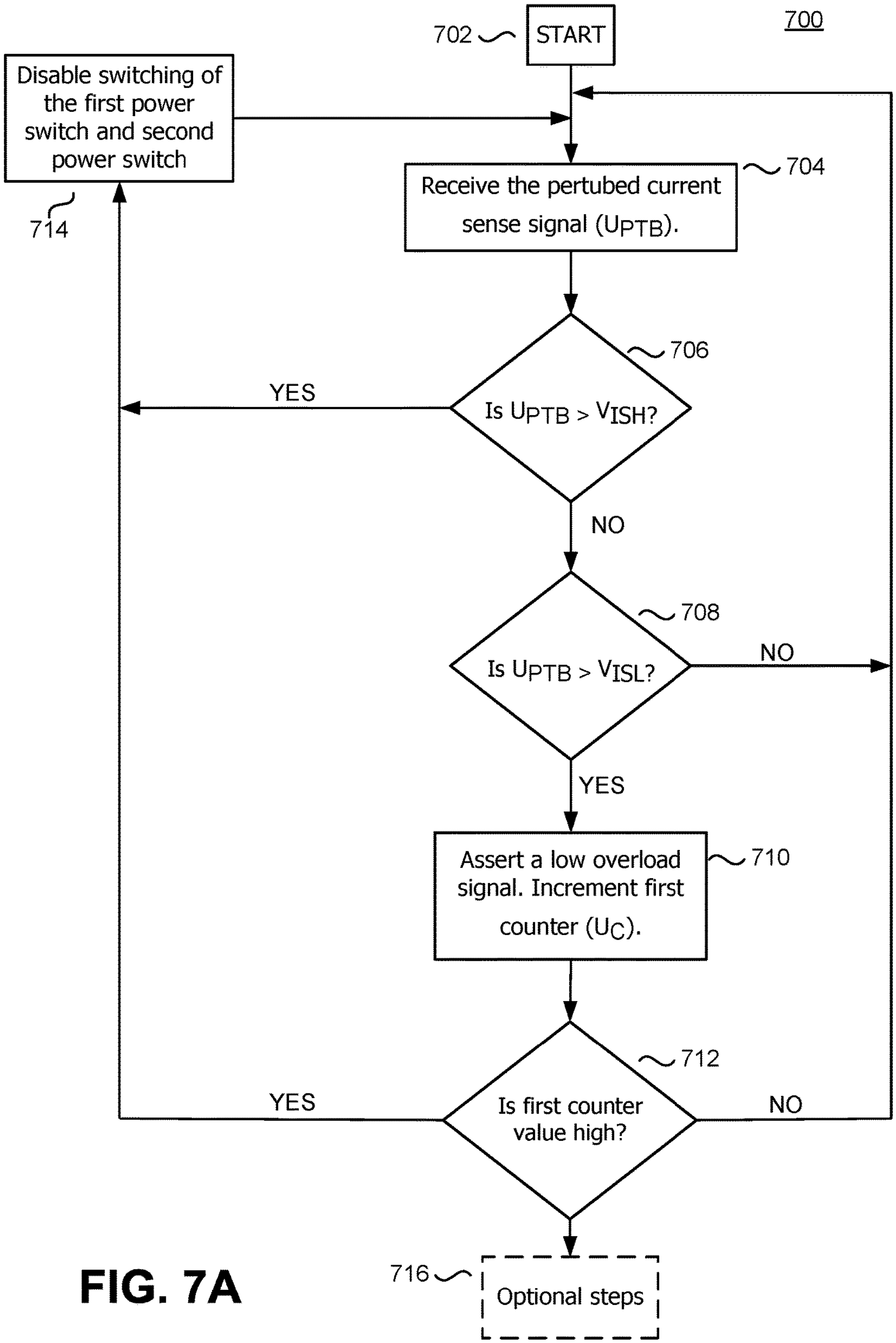
FIG. 7A is a flow diagram illustrating one example of detecting an overcurrent condition for an LLC power converter in accordance with the teachings of the present invention.

FIG. 7A is a flow diagram illustrating an example process 700 for detecting an overcurrent condition in an LLC converter, in accordance with an example of the present invention. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel. FIG. 7A resembles the overcurrent protection circuit illustrated in FIG. 2.

Process 700 begins at the start block 702. Process 700 proceeds to process block 704. The overcurrent protection circuit receives the perturbed current sense signal. Process 700 proceeds to decision block 706. At decision block 706, the overcurrent protection circuit determines if the perturbed current sense signal is greater than a high threshold reference. If the condition is true, process 700 proceeds to process block 714. At process block 714, the control circuit of the controller receives the overcurrent signal and disables the switching of the first power switch and second power switch. If the condition is not true, process 700 proceeds to decision block 708. At decision block 708, the overcurrent protection circuit determines if the perturbed current sense signal is greater than a low threshold reference. If the condition is not true, process 700 loops back to the process block 704. If the condition is true, process 700 proceeds to process block 710. At process block 710, a low overload signal is asserted and a counter within the overcurrent protection circuit is incremented. Process 700 proceeds to decision block 712. At decision block 712, the overcurrent protection circuit determines if the first counter value is high. In other words, has the value of the count been exceeded? If the condition is true, process 700 proceeds to process block 714. If the condition is not true, process 700 loops back to process block 704.

Figure 7B:
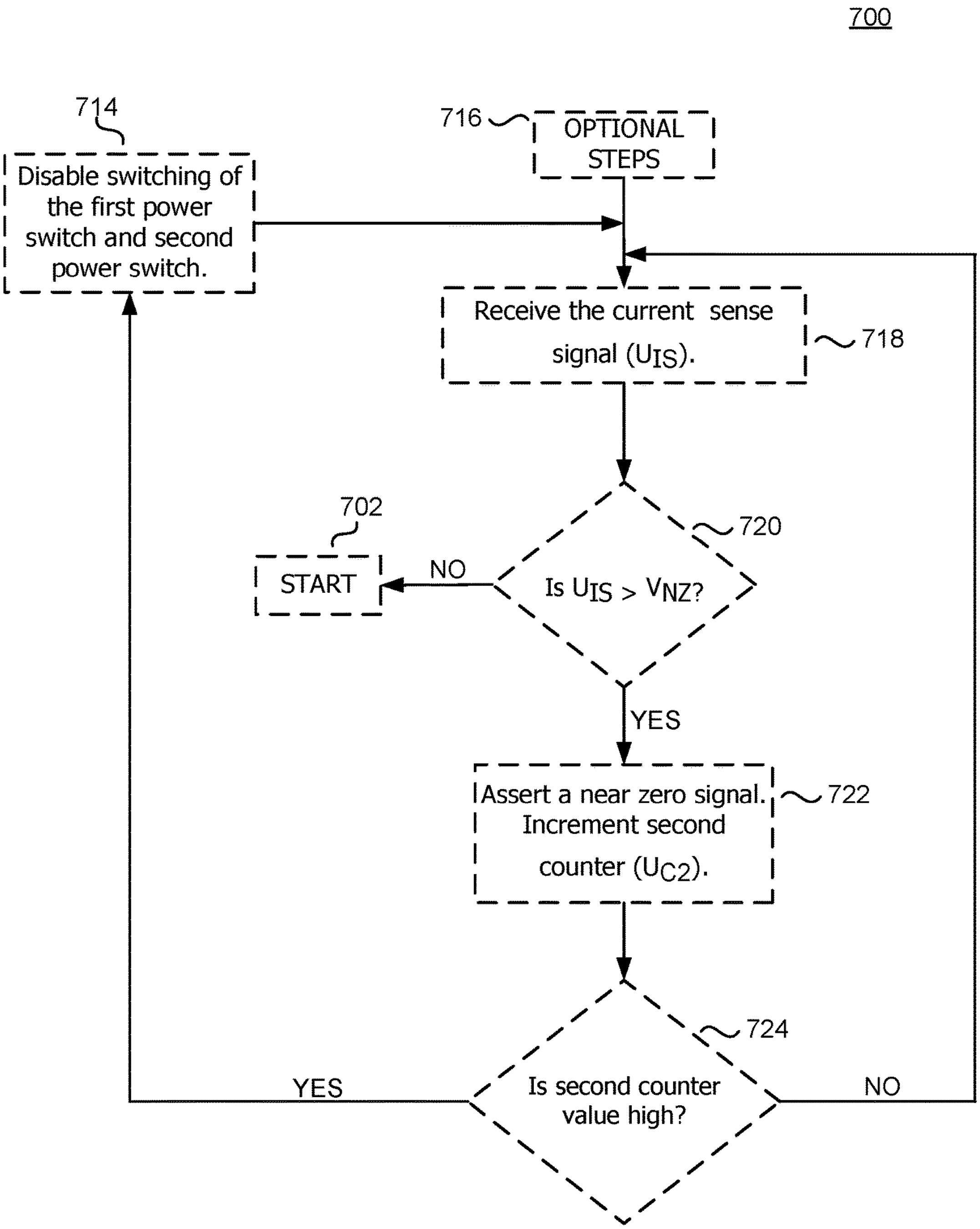
FIG. 7B is a flow diagram illustrating one example of additional steps for detecting an overcurrent condition for an LLC power converter in accordance with the teachings of the present invention.

FIG. 7B is a flow diagram illustrating one example of additional steps for detecting an overcurrent condition for an LLC power converter in accordance with the teachings of the present invention. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

FIG. 7B resembles the overcurrent protection circuit illustrated in FIG. 4 and includes the steps aforementioned in FIG. 7A. Process 700 begins at process block 716. Process 700 proceeds to process block 718. At process block 718, the overcurrent protection circuit receives the current sense signal. Process 700 proceeds to decision block 720. At decision block 720, the overcurrent protection circuit determines if the current sense signal is greater than a near zero threshold reference. If the condition is not true, process 700 proceeds back to the start block 702 as previously mentioned in FIG. 7A. If the condition is true, process 700 proceeds to process block 722. At process block 722, a near zero signal is asserted and a count of the second counter is incremented. Process 700 proceeds to decision block 724. At decision block 724, the overcurrent detection circuit determines if the value of the second counter is high. In other words, has the value of the second count been exceeded? If the condition is not true, process 700 proceeds to process block 718. If the condition is true, process 700 proceeds to process block 714. At process block 714, the control circuit receives the overcurrent signal and disables switching of the first and second power switch.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An LLC resonant converter controller, comprising:

an overcurrent protection circuit coupled to receive a current sense signal representative of current in a primary winding, wherein the overcurrent protection circuit perturbs the current sense signal to produce a perturbed current sense signal and is coupled to output an overcurrent signal when the perturbed current sense signal is above a low threshold for a number of consecutive switching cycles, wherein the overcurrent protection circuit comprises:

a differentiator circuit coupled to generate a differentiator signal in response to receiving a low side drive signal, wherein the differentiator signal and the current sense signal are coupled to form the perturbed current sense signal;

a first comparator coupled to generate a high overload signal when the perturbed current signal is greater than a high threshold reference;

a second comparator coupled to generate a low overload signal when the perturbed current signal is greater than a low threshold reference; and a logic gate having a first input coupled to an output of the first comparator, and a second input coupled to an output of the second comparator, wherein the logic gate is coupled to generate the overcurrent signal in response to the high overload signal or the low overload signal; and a control circuit coupled to generate a high side drive signal and the low side drive signal in response to a feedback signal representative of an output of a resonant converter to control switching of a first power switch and a second power switch, wherein the control circuit is further coupled to receive the overcurrent signal and is operable to disable switching of the first power switch and the second power switch in response to the overcurrent signal.

2. The LLC resonant converter controller of claim 1 wherein the overcurrent protection circuit further includes a first counter, wherein the first counter increments a count signal in response to the low overload signal.

3. The LLC resonant converter controller of claim 1 wherein the overcurrent protection circuit further comprises:

a third comparator coupled to generate a near zero signal when the current sense signal is greater than a near zero threshold reference;

a flip flop coupled to the output of the third comparator, wherein the flip flop generates a near zero indicator signal in response to the near zero signal; and a second counter coupled to the output of the flip flop, wherein the second counter increments a second count signal in response the near zero indicator signal.

4. The LLC resonant converter controller of claim 1 further coupled to a primary sense circuit, wherein the primary sense circuit generates the current sense signal.

5. The LLC resonant converter controller of claim 4 wherein an external differentiator circuit is coupled to the primary sense circuit.

6. The LLC resonant converter controller of claim 5 wherein the external differentiator circuit includes a capacitor coupled to a node between the first power switch and the second power switch of the resonant converter.

7. The LLC resonant converter controller of claim 1 wherein the differentiator circuit is further coupled to a delay circuit, wherein the delay circuit generates a delayed signal of the low side drive signal.

8. A resonant power converter, comprising:

an energy transfer element coupled between an input of the resonant power converter and an output of the power converter;

a first power switch coupled to the input of the power converter and the energy transfer element;

a second power switch coupled to the first power switch; and a resonant converter controller, wherein the resonant converter controller includes:

an overcurrent protection circuit coupled to receive a current sense signal representative of current in a primary winding, wherein the overcurrent protection circuit perturbs the current sense signal to produce a perturbed current sense signal and is coupled to output an overcurrent signal when the perturbed current sense signal is above a low threshold for a number of consecutive switching cycles, wherein the overcurrent protection circuit comprises;

a differentiator circuit coupled to generate a differentiator signal in response to receiving a low side drive signal, wherein the differentiator signal and the current sense signal are combined to form the perturbed current sense signal;

a first comparator coupled to generate a high overload signal when the perturbed current signal is greater than a high threshold reference;

a second comparator coupled to generate a low overload signal when the perturbed signal is greater than a low threshold reference; and a logic gate having a first input coupled to an output of the first comparator, and a second input coupled to an output of the second comparator, wherein the logic gate is coupled to generate the overcurrent signal in response to the high overload signal or the low overload signal; and a control circuit coupled to generate a high side drive signal and the low side drive signal in response to a feedback signal representative of an output of the resonant power converter to control switching of the first power switch and the second power switch, wherein the control circuit is further coupled to receive the overcurrent signal and is operable to disable switching of the first power switch and the second power switch in response to the overcurrent signal.

9. The resonant power converter of claim 8 wherein the overcurrent protection circuit further includes a first counter, wherein the first counter increments a count signal in response to the low overload signal.

10. The resonant power converter of claim 8 wherein the overcurrent protection circuit further includes:

a third comparator coupled to generate a near zero signal in response to the current sense signal being greater than a near zero threshold reference;

a flip flop coupled to the output of the third comparator and wherein the flip flop generates a near zero indicator signal in response to the near zero signal; and a second counter coupled to the output of the flip flop, wherein the second counter increments a second count signal in response the near zero indicator signal.

11. The resonant power converter of claim 8 further coupled to a primary sense circuit, wherein the primary sense circuit generates a current sense signal.

12. The resonant power converter of claim 11 wherein an external differentiator circuit is coupled to the primary sense circuit.

13. The resonant power converter of claim 12 wherein the external differentiator circuit is a capacitor.

* * * * *